June 17, 1969 E. E. CRIST 3,449,839
ROTARY STEAM JOINT AND CONDENSATE SCAVENGER THEREFOR
Original Filed July 7, 1966

INVENTOR.
Elmer E. Crist
BY Hill, Sherman, Meroni, Gross & Simpson
ATTORNEYS

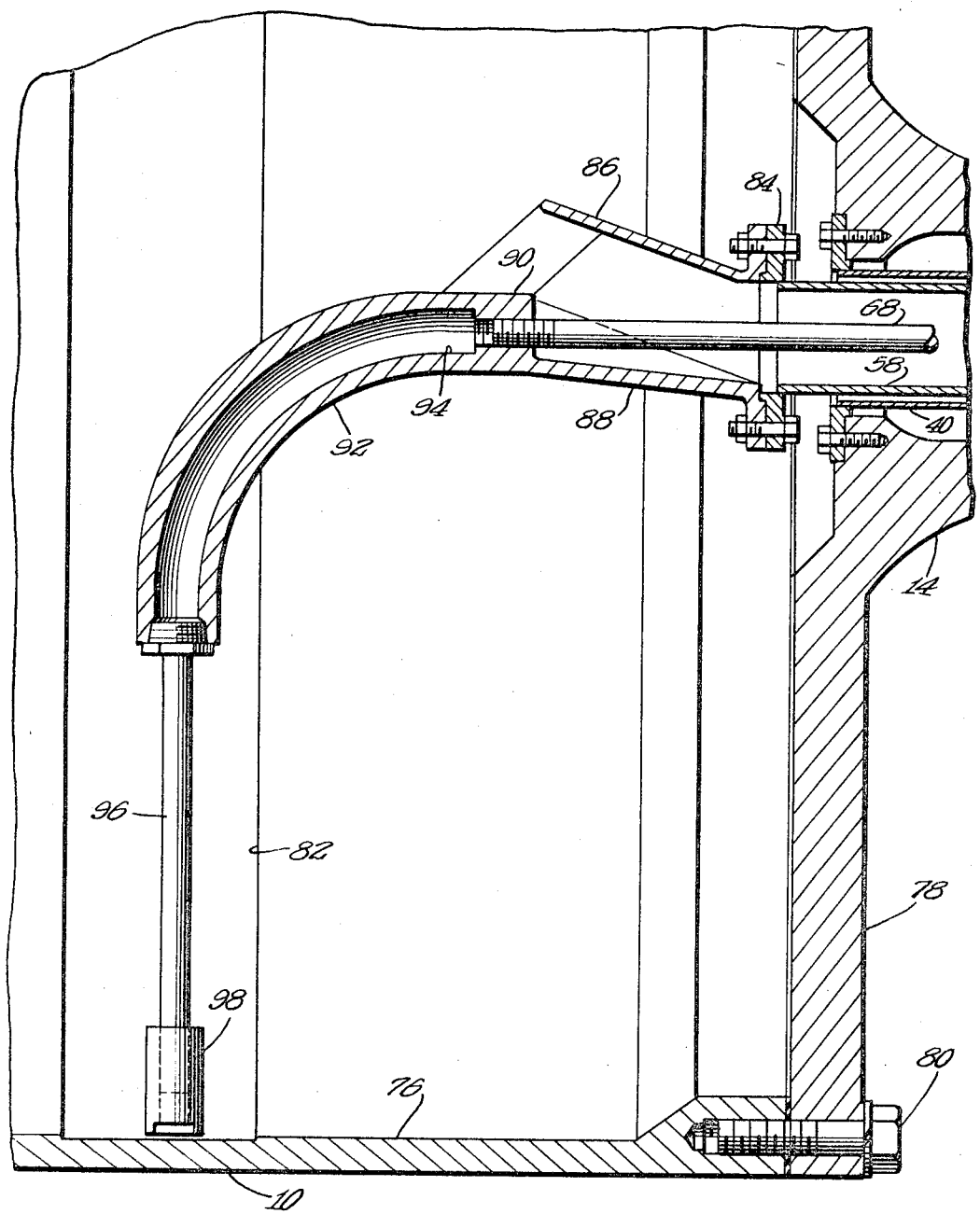

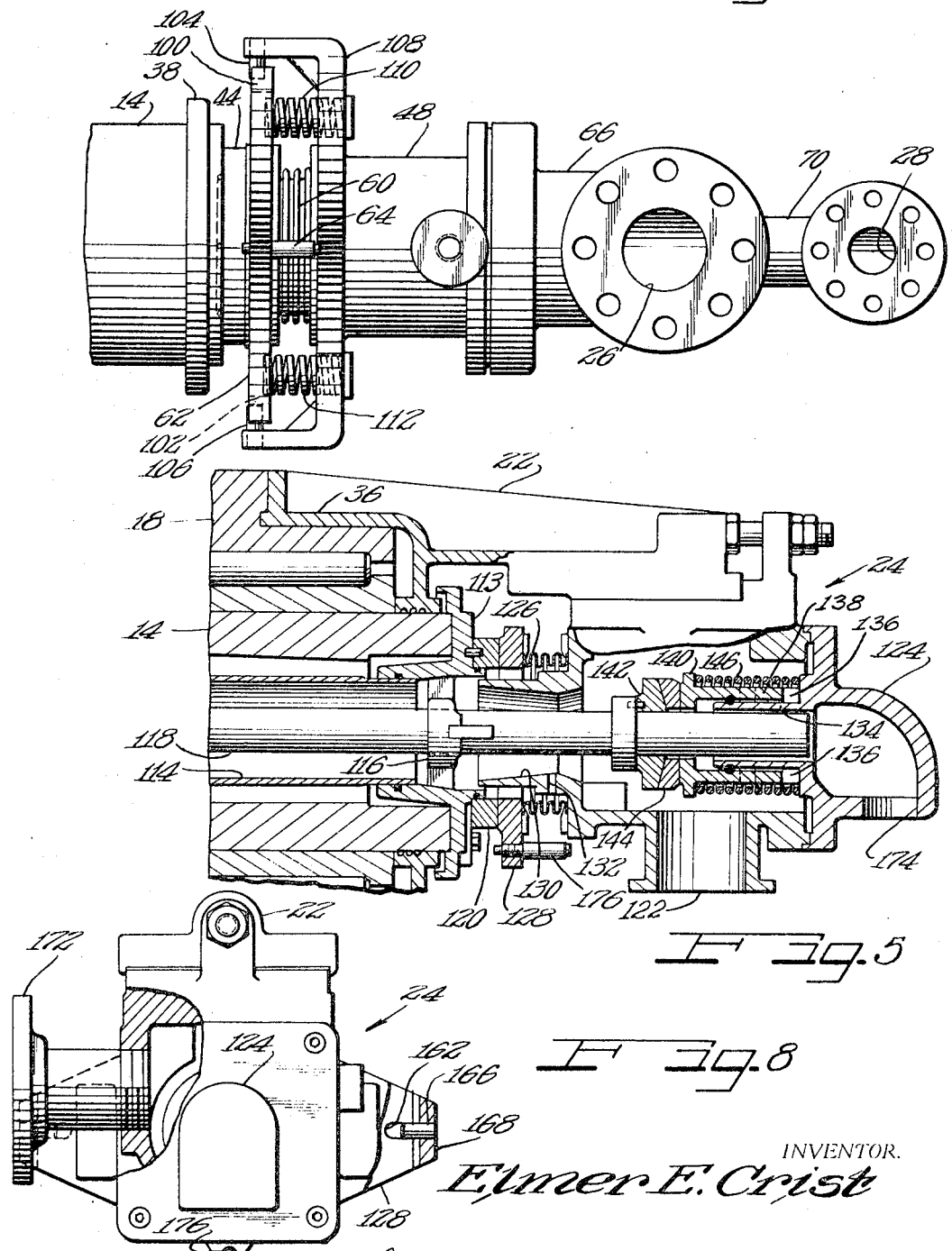

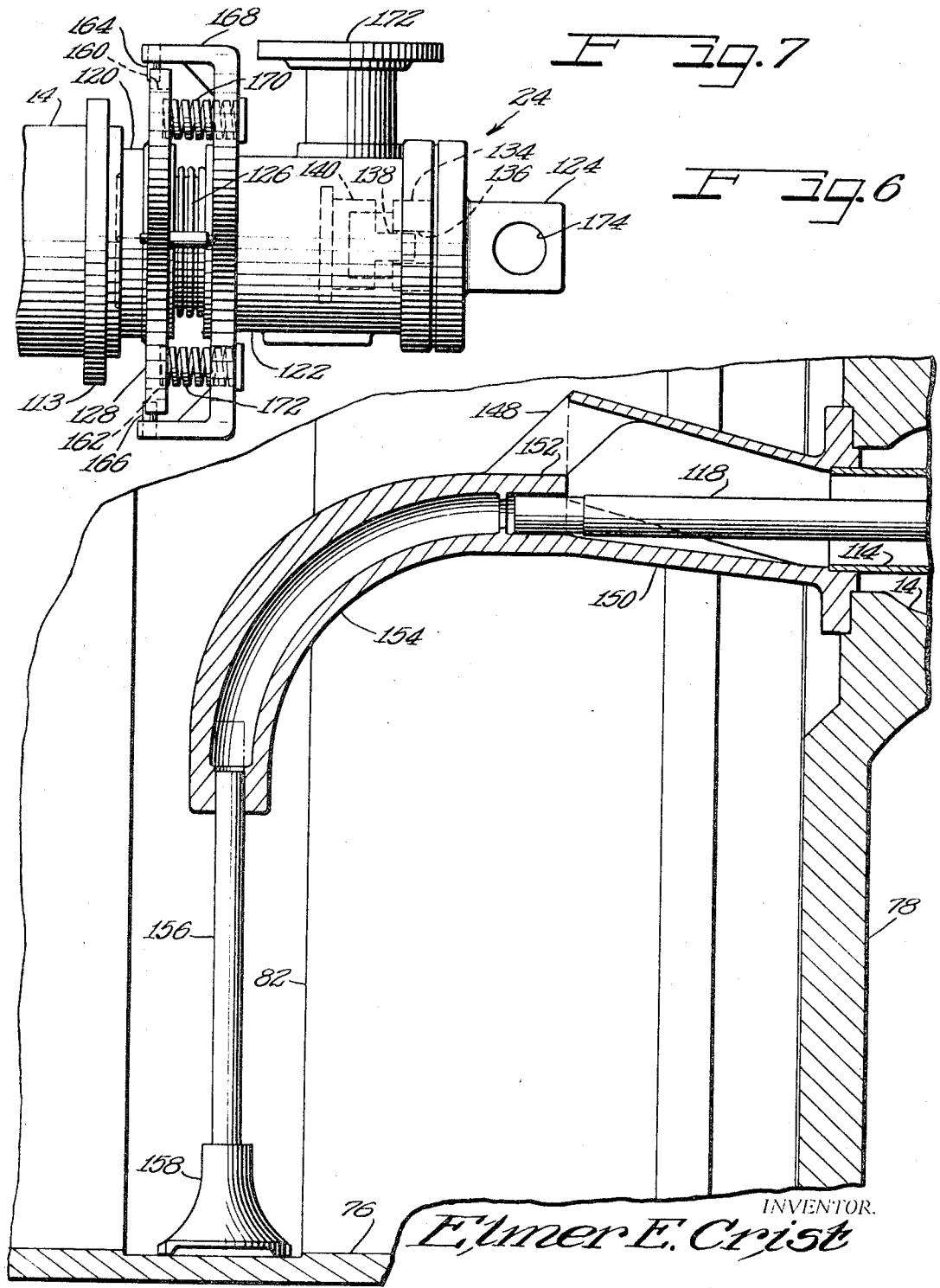

@# United States Patent Office 3,449,839
Patented June 17, 1969

3,449,839
ROTARY STEAM JOINT AND CONDENSATE SCAVENGER THEREFOR
Elmer E. Crist, Beloit, Wis., assignor to Beloit Corporation, Beloit, Wis., a corporation of Wisconsin
Continuation of abandoned application Ser. No. 563,583, July 7, 1966. This application Dec. 21, 1967, Ser. No. 697,552
Int. Cl. F26b *11/02;* F16l *39/04*
U.S. Cl. 34—124
12 Claims

ABSTRACT OF THE DISCLOSURE

Steam inlet fitting particularly adapted for dryer drums heated by steam. The dryer drum is supported on the usual hollow shafts journalled in bearing housings. Steam is introduced into the dryer drum through a steam inlet pipe extending along one hollow shaft. The hollow shaft through which the steam inlet extends has a sealing plate at its outer end and an annular seal mounted thereon and rotating therewith. A sealing member is slidably guided in a non-rotatable housing, mounted on a bearing support for the hollow shaft and is retained from rotatable movement by the housing. Spring means bias the sealing member into sealing engagement with the annular seal. Bellows provide a seal to connect the housing to the sealing member and to accommodate axial movement of the housing toward and from the sealing member due to differences in temperature between the housing and the sealing member and dryer drum. A venturi is in communication with the steam inlet and has a throat in the region of the bellows. A radial passageway leads from the bellows to the throat of the venturi to scavenge steam and condensate from the bellows formed by leakage of steam from the drum to the bellows, as steam passes along the venturi.

---

This application is a continuation of application Ser. No. 563,583, filed July 7, 1966, now abandoned, and entitled "Rotary Steam Joint."

A problem present in introducing steam or other hot fluid into a rotating drum for heating the drum for drying purposes, is the formation of condensate in the expansible sealing connection between the steam inlet housing and the end of the dryer drum caused by leakage of steam from the drum to the bellows. In accordance with the principles of the present invention, I utilize a venturi in communication with the steam inlet into the dryer drum and provide a radial passageway from the expansible sealing connection to the venturi, to withdraw steam and condensate from the expansible connection and to thereby avoid the accumulation of water in the expansible connection.

A principal object of the present invention, therefore, is to provide an improved form of fitting for introducing steam or hot fluid into a rotating drum, in which the fitting is expansible upon difference in temperatures between the dryer drum and the housing supporting the fitting, and in which a simple and novel means is provided for removing hot fluid leaking back into the expansible portion of the fitting, and removing condensate from the fitting caused by leakage of steam into the fitting.

A further object of the present invention is to provide an inlet fitting for a dryer drum, for supplying steam or other hot fluid to the dryer drum, and to accommodate expansion and contraction of the dryer drum relative to the support housing for the fitting by the provision of a bellows, sealing the dryer drum to the fitting, and to withdraw hot fluid leaking to the bellows and condensate formed in the bellows, by a venturi in the region of the bellows, through which the hot fluid passes, and by providing a suction passageway leading from the region of the interior of the bellows through the venturi to the throat of the venturi.

These and other objects of the present invention will be more fully realized and understood from the following detailed description when taken in conjunction with the accompanying drawings wherein:

FIGURE 3 is a view in section and partially broken away illustrating the steam and condensate conduits within the dryer drum which structures are employed in conjunction with those illustrated in FIGURE 2;

FIGURE 4 is a bottom view partially broken away of the steam fitting illustrated in FIGURE 2;

FIGURE 5 is a view in section and partially broken away of still another embodiment of the steam fitting of the present invention;

FIGURE 6 is a view in section and partially broken away of the steam and condensate conduits within the dryer drum, which structures are employed in combination with those illustrated in FIGURE 5;

FIGURE 7 is a bottom view partially broken away of the steam fitting illustrated in FIGURE 5; and FIGURE 8 is an end view of the steam fitting illustrated in FIGURE 5.

Like reference numerals throughout the various views of the drawings are intended to designate the same or similar structures.

As shown on the drawings:

Figures 1, 2:
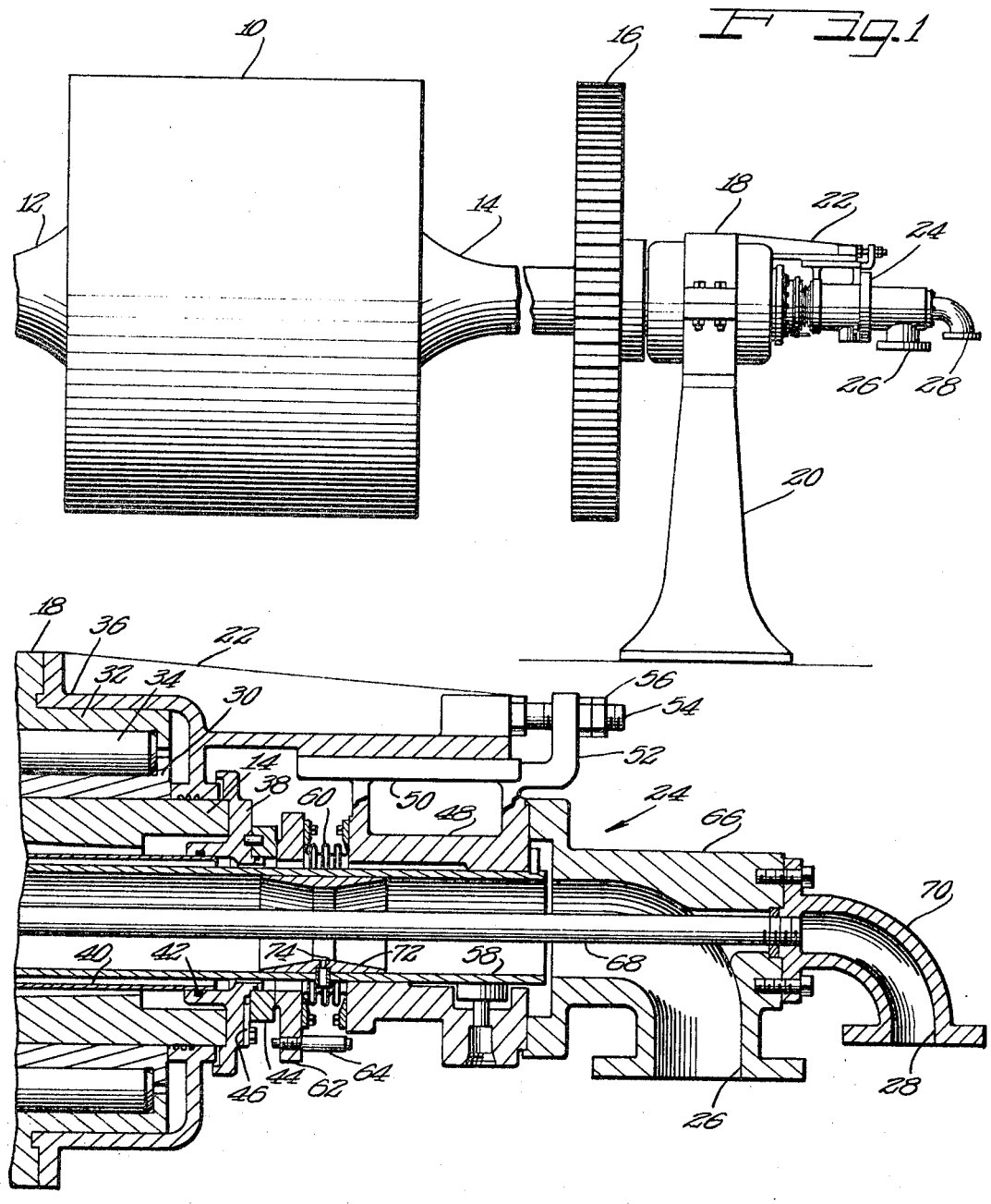
FIGURE 1 is a side elevational view partially broken away and illustrating a dryer drum supported at one end thereof on a bearing mount and having a steam fitting secured thereto for introducing steam to the dryer drum and removing condensate therefrom.
FIGURE 2 is a view in section and partially broken away and illustrating one embodiment of the steam fitting of the present invention.

With reference to the drawings in detail and in particular to FIGURE 1, there is shown a steam dryer drum generally indicated with the reference numeral 10 which is mounted for rotation on shafts 12 and 14. A drive gear 16 is secured to the shaft 14 for rotating the dryer drum 10. The shaft 14 is journalled in a bearing 18 which is mounted on a support base 20. A support member 22 extends from the bearing housing 18 and supports a housing 24 thereon. The housing 24 includes a steam inlet 26 and a condensate outlet 28.

The bearing housing 18 and the steam inlet 26 and condensate outlet 28 are stationary members while the drum 10, the shafts 12, 14 and the gear 16 are rotatable. The shaft 14 is hollow to accommodate a steam and condensate conduit which extend from the steam inlet 26 and condensate outlet 28 into the dryer drum 10. This arrangement, however, is better shown in FIGURES 2 and 3 wherein one embodiment of the steam fitting is shown in greater detail.

As shown in FIGURE 2, the bearing 18 includes an inner race 30 secured to one end of the shaft 14 and an outer race 32. Roller bearings 34 between the races 30, 32 support the shaft 14 for rotational movement. A bearing housing 36 encompasses the races 30, 32 and sealingly engages with the shaft 14. An end plate 38 is bolted to one end of the hollow shaft 14 and supports a sealing tube 40 therein. An O-ring 42 is provided between the end plate 38 and the sealing tube 40.

Secured to the end plate 38 is an annular bearing 44 preferably of carbon material. The backside of the annular bearing 44 is vented by means of apertures 46. The annular bearing 44 cooperates with a sealing ring 62 to form a face seal, as will hereinafter more clearly appear as this specification proceeds.

The housing 24 includes a clamping unit 48 which supports a guide bar 50 thereon. The support member 22 which extends from the bearing housing 36 is splined to the guide bar 50 for alignment of the clamping unit 48. An upstanding flange 52 also extends from the clamping unit 48 and the lateral position of the clamping unit 48 is fixed by means of a bolt 54 extending from the support member 22 through the flange 52 and having nuts 56 thereon for drawing-up on the clamping unit 48. A steam conduit 58 is supported in cantilever fashion within the clamping unit 48 and extends through the fitting and sealing tube 42 to the dryer drum 10.

A bellows 60 is secured to one end of the clamping unit 48 and coaxially aligned with the steam conduit 58 passing therethrough. A sealing ring 62 is secured to the free end of the bellows 60 and engages the annular bearing 44. A wear indicator 64 extends from the sealing member 62 and provides an indication of the wear on the annular bearing 44 and the sealing member 62 by alignment with one end of the clamping unit 48.

The housing 24 also includes an inlet unit 66 having the inlet 26 therein which extends to coaxial alignment with the steam conduit 58. A condensate conduit 68 extends through and is coaxial with the steam conduit 58. The housing 24 also includes a condensate outlet unit 70 having the condensate outlet 28 therein and aligned with the condensate conduit 68. The condensate conduit 68 is threadably engaged with one end wall of the condensate outlet unit 70 which is bolted to the steam inlet unit 66. The condensate conduit 68 extends into the dryer drum 10 to remove condensate therefrom.

Within the steam conduit 58 and coaxial therewith in the region of the bellows 66 is a Venturi having a restricted throat 72. A suction passageway 74 leads through the steam conduit 58 and Venturi radially from the interior of the bellows 60 to the throat 72. Suction is created in the suction passageway by the passing of high pressure fluid or steam through the Venturi to scavenge steam and condensate from the region of the bellows 60, and the sealing members 44 and 62. This condensate and steam, in the expansible part of the seal results from the leakage of steam to the expensible portion of the seal past the seals 40 and 62, a part of which steam is drawn through the suction passageway 74 and a balance of which steam condenses in the region of the bellows 60, particularly when the dryer drum is shut down. This causes an undesirable accumulation of water in the bellows, which must later be removed. The steam conduit 58 is sealed to the clamping unit 48 to prevent steam from leaking from the housing 24.

It can be readily appreciated that the shaft 14, the sealing tube 40, the end plate 38, and the sealing ring 44 rotate with the drum 10, while the steam conduit 58, the housing 24, the bellows 60, and the sealing member 62 remain stationary. Therefore, sealing action exists between the two sealing members 44, 62 and, by means of the bellows 60, the sealing member 62 may be biased toward the annular bearing 44 to retain constant sealing regardless of wear between the moving and the stationary parts. When wear reduces the thickness of either of the annular bearing 44 and sealing member 62, the wear indicator 64 provides a visual indication of such wear.

As shown in FIGURE 3, the drum 10 includes an outer cylindrical wall 76 and an end wall 78 which is formed integrally with the hollow shaft 14. The end wall 78 is secured by any suitable means such as the bolt 80 to the cylindrical wall 76. The cylindrical wall 76 of the drum 10 includes a central recessed portion 82 extending around the entire circumference of the cylindrical wall 76 for collecting condensate therein.

The sealing tube 40 extends through the hollow shaft 14 and terminates and is sealed against the inner surface of the end wall 78. The steam conduit 58 and condensate conduit 68 extend coaxially with respect to one another through the hollow shaft 14 to within the drum 10. The steam conduit 58 terminates in a flanged portion 84 to which is bolted a steam outlet nozzle 86. Steam enters the interior of the drum 10 through the steam outlet nozzle 86 which was originally introduced into the steam fitting at the steam inlet 26.

A bottom wall 88 of the steam outlet nozzle 86 includes an enlarged portion 90 which threadably engages one end of the condensate conduit 68. The enlarged portion 90 is extended in the form of a tube 92 having a passage 94 therein which is bent through a 90° angle to approximately a centerline of the recess 82. A condensate pickup tube 96 is threadably engaged with one end of the tube 92 and includes a pickup scoop 98 at one end thereof. The pickup scoop 98 is positioned within and in close proximity to a bottom wall of the recess 82. Pressure developed within the dryer drum 10 will cause any condensate in the recess 82 to be forced upwardly in the tube 96 into the condensate conduit 68. Condensate will continue to form as steam is supplied to the dryer drum 10 and such condensate will collect in the recess 82 and be forced into the condensate conduit by the pressure within the dryer drum 10. Adequate recirculating valve means may be employed between the condensate outlet 28 and the steam inlet 26 for returning any steam escaping through the condensate conduit 68.

A bottom view of the steam fitting illustrated in FIGURE 2 is shown in FIGURE 4 with the bearing 18 removed therefrom. As shown therein, the hollow shaft 14 supports the end plate 38 thereon which in turn supports one of the sealing members 44. The other sealing member 62 includes a pair of slots 100 and 102 into which fingers 104 and 106 respectively engage. The fingers 104, 106 are supported on respective ends of a flange 108 formed integrally with the clamping unit 48. The slots 100, 102 and the interengaging fingers 104, 106 restrict any rotary movement of the sealing member 62 while allowing lateral movement thereof to effectuate continued engagement with the sealing member 44. The sealing member 62 is biased against the sealing member 44 by means of springs 110 and 112 extending between the flange member 108 and the sealing member 62. Lateral movement of the sealing member 62 with respect to the clamping unit 48 is permitted by means of the bellows 60 therebetween.

FIGURE 5 illustrates another embodiment of the steam fitting similar to that illustrated in FIGURE 2, but with the exception that the steam and condensate conduits rotate with the rotating dryer drum 10. As shown in FIGURE 5, the bearing 18 supports one end of the shaft 14 for rotational movement. The support member 22 extends from the bearing housing 36 and supports the housing 24 in aligned relationship with the shaft 14. An end plate 113 is secured to one end of the shaft 14 and supports a steam conduit 14 within the hollow shaft 14. A web and collar assembly 116 is supported within a center aperture of the end plate 113 and supports a condensate conduit 118 therein. In this manner, steam may pass through the web portions of the web and collar assembly 116 over the condensate conduit 118 and into the steam conduit 114. An annular bearing 120 preferably fabricated of a carbon material is secured to one face of the end wall 113.

The housing 24 includes a steam inlet unit 122 and a condensate outlet unit 124. To one end of the steam inlet 122 which faces the shaft 14 is secured a bellows 126. The bellows 126 supports a sealing member 128 thereon in direct engagement with the annular bearing 120. From the same face of the steam inlet unit 122 extends a Venturi section 130 having a restricted throat. A suction passageway 132 leads radially from the region of the bellows 126 and the annular bearing 120 and sealing member 128 to the restricted throat to scavenge steam and condensate from the bellows 126.

The condensate outlet unit 124 includes a cylindrical sleeve 134 which encompasses one end of the condensate conduit 118. The cylindrical sleeve 134 includes slots 136 engaged by fingers 138 extending from a cylindrical sealing member 140. The cylindrical sleeve 134 and cylindrical sealing member 140 are sealed from one another by means of an O-ring or other suitable sealing means. The finger and slot interengagement of the sleeve 134 with the sealing member 140 restricts rotary movement therebetween while allowing respective lateral movement.

A collar 142 is secured to the condensate conduit 118 and supports a sealing member 144 thereon preferably of a carbon material. A spring 146 encircles the cylindrical sealing member 140 and engages one surface of the condensate outlet unit 124 for biasing the cylindrical sealing member 140 toward the sealing member 144. This structure, including the condensate conduit 118, the sealing members 140, 144, and the spring 146 provides a sealing arrangement between the rotating condensate conduit 118 and the condensate outlet unit 124. Therefore, the structures illustrated in FIGURE 5 provide for the steam conduit 114 and the condensate conduit 118 to rotate with the dryer drum 10 and the hollow shaft 14.

As illustrated in FIGURE 6, the steam conduit 114 extends to and is sealed within one end of a steam discharge nozzle 148. The nozzle 148 is also sealed with the end wall 78 of the dryer drum 10 formed integrally with the hollow shaft 14. One wall 150 of the steam discharge nozzle 148 includes an enlarged portion 152 which receives one end of the condensate conduit 118 therein. The enlarged portion 152 is extended to form a curved tube 154 which receives a pickup condensate tube 156 in the other end thereof. As shown by the phantom lines at the one end of the tube 156, the tube 156 is slidable within the end of the tube 154. A pickup scoop unit 158 is attached to the tube 156 and is secured to a bottom surface of the recess 82 in the wall 76 of the dryer drum 10. In this manner, the pickup unit 158, the tubes 154, 156, the steam discharge nozzle 148, the steam conduit 114, and the condensate conduit 118 rotate as a unit with the dryer drum 10. As the dryer drum 10 rotates, the condensate pickup unit 158 scoops up condensate formed within the recess 82 and delivers it through the tubes 156, 154 to the condensate conduit 118.

A bottom view of the steam fitting illustrated in FIGURE 5 is shown in FIGURE 7 with the bearing 18 removed from the shaft 14. The end plate 113 is shown at one end of the hollow shaft 14 with the sealing member 120 secured thereto. The sealing member 128 is shown engaging the sealing member 120 and includes a pair of slots 160 and 162 into which pins or fingers 164 and 166 extend respectively. The pins 164, 166 are secured to a flanged member 168 formed integrally with the steam inlet unit 122 of the housing 24. A pair of springs 170 and 172 are provided between the flanged member 168 and the sealing member 128 for biasing the sealing member 128 toward the sealing member 120. The bellows 126 and the slots 160, 162 with the interengaging fingers 164, 166 allow lateral movement of the sealing member with respect to the steam inlet housing 122 while restricting rotary movement therebetween. The steam inlet housing is provided with a steam inlet 172 and the condensate outlet unit 124 is provided with a condensate outlet 174.

The fingers 138 on the cylindrical sealing member 140 are better illustrated in FIGURE 7 as engaging the slots 136 in the cylindrical sleeve 134 of the condensate outlet unit 124.

An end view of the fitting illustrated in FIGURES 5 and 7 is shown in FIGURE 8 to better illustrate the relationship of the pins 164, 166 interengaging with the slots 160, 162. As shown in FIGURE 8, the pin 166 engages the slot 162 for maintaining the sealing member 128 rotationally stationary while allowing lateral movement of the sealing member 128 to maintain sealing engagement thereof against the sealing member 120. As illustrated in FIGURES 5 and 8, a wear indicator 176 is provided for indicating the amount of wear between the two sealing members 120, 128.

I claim as my invention:

1. A steam fitting particularly adapted to supply steam and other hot fluids into a rotating dryer drum and the like, to heat the drum,
  (a) bearing housings at opposite ends of said dryer drum,
  (b) shafts rotatably supporting said dryer drum on said bearing housings,
    (1) at least one of said shafts being hollow,
  (c) a housing spaced from the outer end of said hollow shaft and supported in alignment with said shaft,
  (d) a high temperature steam inlet leading into said housing,
  (e) a steam pipe having fluid communication with said steam inlet and extending along said hollow shaft into said drum,
  (f) a seal for the end of said hollow shaft,
  (g) an expansible sealing connection coaxial with said hollow shaft and disposed between said seal and said housing and sealed thereto to compensate for differences in temperature between said drum and housing,
  (h) a Venturi coaxial with said expansible sealing connection and bridging said expansible sealing connection and having
    (1) a restricted throat, and
  (i) a passageway leading from the region of said expansible connection to said throat of said Venturi, to scavenge condensate from within said expansible connection, by the passage of steam along said Venturi.

2. The structure of claim 1,
  wherein the expansible sealing connection is a bellows having sealing engagement with said seal and said housing,
  wherein the steam pipe leads from said housing and is clamped thereto, and
  wherein the Venturi is mounted in said steam pipe in alignment with said bellows.

3. The structure of claim 1,
  wherein the Venturi extends from said housing in communication with said steam inlet and is separate from said steam pipe and in axial alignment therewith.

4. The structure of claim 1,
  wherein the expansible sealing connection is a bellows sealed to said seal and said housing,
  wherein the Venturi extends from said housing in communication with said steam inlet and is separate from said steam pipe and is in axial alignment therewith.

5. The structure of claim 1,
  wherein an end plate is secured to the end of said hollow shaft,
  wherein an annular bearing is mounted on said end plate coaxial with said hollow shaft for rotation therewith,
  wherein the sealing ring is biased into engagement with said annular bearing,
  wherein a flange member extends from the end of said housing adjacent said sealing ring, and has portions extending along opposite ends of said sealing ring in spaced relation with respect thereto, and
  wherein slidable guiding connections are provided between said housing and said sealing ring for retaining said sealing ring from rotation with respect to said bearing, which comprise, interengaging slidable guiding connections between said portions of said flange member extending along opposite sides of said sealing ring.

6. The structure of claim 5,
  wherein a wear indicator extends from said sealing ring along the outside of said bellows and cooperates with said flange member, to indicate wear of said bearing.

7. The structure of claim 5, wherein the expansible sealing connection is a bellows sealed to said sealing ring at one end and to said housing at its opposite end, and
wherein the Venturi is mounted in said steam pipe.

8. The structure of claim 5,
wherein the expansible sealing connection is a bellows, and
wherein the Venturi extends from said housing in communication with said steam inlet and is separate from said steam pipe and in axial alignment therewith.

9. A fitting particularly adapted to introduce heated fluid such as steam into the hollow interior of a rotating dryer drum and to remove condensate from the drum,
  bearing housings at opposite ends of the drum,
  shafts extending from opposite ends of said drum and journalled in said bearing housings,
    at least one of said shafts being hollow and affording communication to the hollow interior of the drum,
  a housing mounted on said bearing housing for the hollow shaft and spaced in advance of said hollow shaft for movement toward and from said hollow shaft and held from rotation with respect to said hollow shaft,
  a steam inlet leading into said housing,
  a condensate outlet leading from said housing,
  a condensate pipe connected with said condensate outlet and extending along the hollow interior of said hollow shaft into said drum,
  a steam pipe encircling said condensate outlet and having communication with said steam inlet and extending along said hollow shaft in radially spaced relation with respect to said condensate outlet,
  an end plate for said hollow shaft,
  an annular bearing on said end plate coaxial with said hollow shaft and rotatable with said end plate and hollow shaft,
  a sealing ring engageable with said annular bearing,
  yieldable means biasing said sealing ring into engagement with said annular bearing,
  means retaining said sealing ring from rotation with respect to said annular bearing,
  bellows encircling said hollow shaft and having sealing engagement with said sealing ring and said housing,
  a Venturi coaxial with said steam pipe and bridging said bellows and having a throat,
  a radial passageway leading from the region of said bellows to said throat, to aspirate condensate from said bellows by the passage of steam along said Venturi.

10. The structure of claim 9,
wherein the steam pipe extends from said housing and is sealed thereto, and
wherein the Venturi is mounted in said steam pipe in alignment with said bellows.

11. The structure of claim 9,
wherein the Venturi extends from said housing in communication with said steam inlet and is separate from said steam pipe and in axial alignment therewith.

12. The structure of claim 9,
wherein a flange member extends from the end of said housing adjacent said sealing ring, and has portions extending along opposite sides of said sealing ring in spaced relation with respect thereto,
and wherein slidable guiding connections are provided between said housing and said sealing ring for retaining said sealing ring from rotation with respect to said bearing, which comprises interengaging slidable guiding connections between said portions of said flange member extending along opposite sides of said sealing ring.

References Cited

UNITED STATES PATENTS

| 2,381,432 | 8/1945 | Bratton | 34—124 |
| 3,325,910 | 6/1967 | Toivonen | 34—124 |

FOREIGN PATENTS

| 784,269 | 4/1935 | France. |

CARLTON R. CROYLE, *Primary Examiner.*

A. D. HERRMANN, *Assistant Examiner.*

U.S. Cl. X.R.

165—89; 285—134